Figure 1:
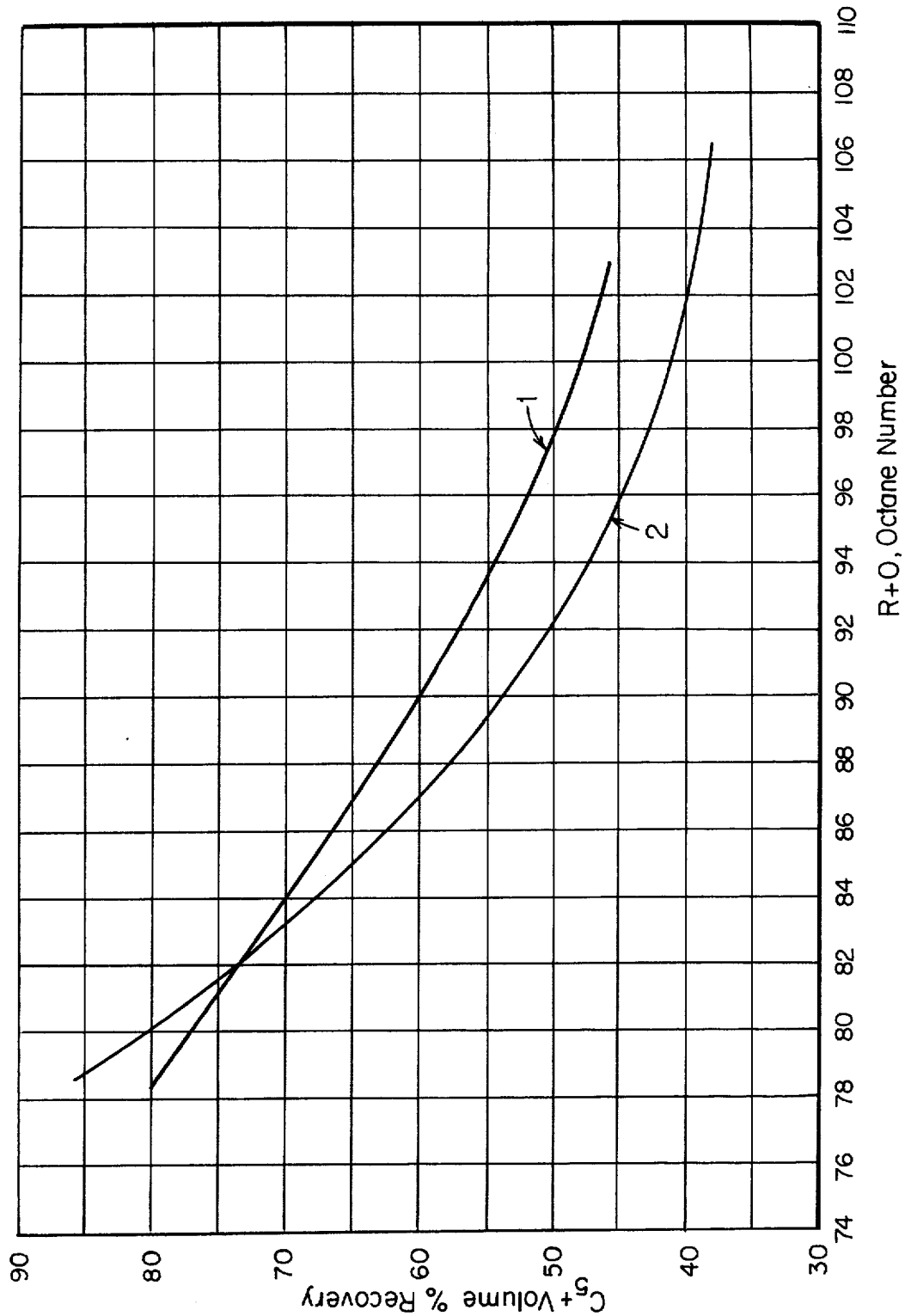

United States Patent [19]

Morrison

[11] 3,890,218
[45] June 17, 1975

[54] UPGRADING ALIPHATIC NAPHTHAS TO HIGHER OCTANE GASOLINE

[75] Inventor: Roger A. Morrison, West Deptford, N.J.

[73] Assignee: Mobil Oil Corporation, New York, N.Y.

[22] Filed: Mar. 29, 1974

[21] Appl. No.: 456,398

[52] U.S. Cl............ 208/135; 260/673.5; 252/455 Z
[51] Int. Cl.............................................. C10g 35/06
[58] Field of Search ......... 208/135; 260/673, 673.5; 252/455 Z

[56] References Cited
UNITED STATES PATENTS

| | | | |
|---|---|---|---|
| 2,971,903 | 2/1961 | Kimberlin | 208/119 |
| 3,331,768 | 7/1967 | Burgess et al. | 208/111 |
| 3,702,886 | 11/1972 | Argauer et al. | 423/328 |
| 3,709,979 | 1/1973 | Chu | 423/328 |
| 3,729,409 | 4/1973 | Chen | 208/135 |
| 3,756,942 | 9/1973 | Cattanach | 208/137 |
| 3,760,024 | 9/1973 | Cattanach | 260/673 |
| 3,775,501 | 11/1973 | Kaeding et al. | 260/673.5 |

*Primary Examiner*—Delbert E. Gantz
*Assistant Examiner*—Juanita M. Nelson
*Attorney, Agent, or Firm*—Charles A. Huggett; Michael G. Gilman

[57] ABSTRACT

In the conversion upgrading of feed naphtha boiling range hydrocarbons which are predominantly aliphatic to equivalent boiling range product of increased aromatics content and octane number by contact of the feed with a high silica to alumina ratio crystalline aluminosilicate zeolite having a constraint index of about 1 to 12 and a crystal density of not substantially lower than about 1.6 grams per cubic centimeter under conversion conditions, which zeolite has incorporated therewith one or more metals, such as zinc or cadmium, which increase the aromatization activity thereof; the improvement, whereby increasing the liquid yield of such conversion at equivalent octane number increase, which comprises using as the catalyst for such conversion a metal modified zeolite as aforesaid having a modified activity equivalent to the activity of such zeolite which has had incorporated therewith in addition up to about 3 weight percent of at least one element of groups Ia and/or Va of the Periodic Table. Operation according to this invention is particularly appropriate in producing products having octane numbers of at least about 82.

8 Claims, 2 Drawing Figures

UPGRADING ALIPHATIC NAPHTHAS TO HIGHER OCTANE GASOLINE

This invention relates to hydrocarbon conversion. It more particularly refers to improved processes for upgrading the octane number of relatively low octane gasoline-boiling range fractions.

Modern petroleum refinery technology is capable of reforming naphthas which are paraffinic and/or naphthenic in nature in order to increase the octane number thereof. Such reforming is traditionally carried out in contact with platinum type reforming catalysts and is a widely used commercial refinery process. Platinum reforming is particularly well suited to use in upgrading naphthenic fractions to aromatic fractions.

More recently it has been discovered that naphtha fractions, which are not particularly naphthenic or which may contain substantially no naphthenes at all, can be conveniently aromatized in good, commercially acceptable yields by converting such feeds, under relatively severe conditions, in contact with a ZSM-5 type crystalline aluminosilicate zeolite catalyst. Highly aromatic liquid yields of upwards of 30 percent have been readily achieved by this new process.

In a similar process, aromatics containing feeds, such as reformates, have been upgraded in a manner whereby their aromatic contents have been increased by contacting such feeds with this same kind of catalyst, that is, a ZSM-5 type aluminosilicate zeolite. This latter process is believed to operate by selectively cracking aliphatics in the feed to produce active fragments at least some of which alkylate existing aromatics in the feed whereby increasing the highly desirable, high octane aromatics content thereof while decreasing the less desirable, low octane paraffin content thereof.

The principal differences between these two processes are the feeds being converted and the severity of conversion conditions. The first aforesaid process is principally valuable for converting a predominantly aliphatic feed and operates at about 650° to 1500°F at a space velocity of about 1 to 15 WHSV. The second aforesaid process is principally valuable for converting a feed which is already rich in aromatics and operates at about 500° to 1000°F. It will be seen that the operating conditions overlap to some extent as do the feeds. It is probable that some cracking-alkylation and some aromatization take place in both processes. The distinction between the processes is perhaps better expressed as one of conversion predominance with the more severe conditions favoring new aromatic ring formation and the less severe conditions favoring alkylation of preformed or newly created aromatic rings.

In either case, it has been shown that the processes referred to above are improved when the ZSM-5 type catalyst is modified to include a certain proportion, e.g. up to about 10 weight percent, of zinc or cadmium, or other similarly promoting metal therein. Such metal is suitably incorporated with the special zeolite by cation exchange, impregnation and/or vapor deposition. It has also been shown that the further inclusion of copper into such a catalyst composition is beneficial especially in that the loss during regeneration of zinc and/or cadmium is significantly reduced thereby.

Many patents and/or patent applications are pertinent to this state of the art. Of particular interest with respect to examples of materials for the zeolitic portion of the catalyst useful in these processes are U.S. Pat. Nos. 3,702,886 and 3,709,979, U.S. applications Ser. Nos. 130,442 and 358,192 filed Apr. 11, 1971 and May 7, 1973 respectively and West German Offenlagunschrifft 2,213,109 all of which are incorporated herein by reference. Of particular interest with respect to the processes herein above described are U.S. Pat. Nos. 3,729,409; 3,756,942 and 3,760,024.

Despite the fact that the technology referred to above is excellent in upgrading the quality of gasoline boiling range fragments, in these times of tightening crude oil supplies, one important consideration in addition to the octane boost obtained is the liquid yield obtained.

It is therefore an important object of this invention to provide an improved process for increasing the aromatics content of gasoline boiling range hydrocarbon fractions.

It is another object of this invention to provide a novel catalyst to accomplish such improvement.

It is a further object of this invention to provide an improved aromatization process having a higher yield/octane relationship than was heretofore available.

Other and additional objects of this invention will become apparent from a consideration of this entire specification including the claims and drawing hereof.

Understanding of this invention will be facilitated by reference to the drawing which is a pair of curves comparing operation of the process described herein with two different catalysts.

In accord with and fulfilling these objects, one aspect of this invention resides in a process of increasing the aromatics content, and therefore the octane number, of a hydrocarbon feed having a boiling range up to about 430°F by contacting such feed with a catalyst comprising a crystalline aluminosilicate zeolite, having a silica to alumina ratio of at least about 12, a constraint index of about 1 to 12, preferably about 2 to 7, a crystal density of not substantially below about 1.6 grams per cubic centimeter and up to about 10 weight percent zinc and/or cadmium, at about 500° to 1500°F and a space velocity of at least about 1 WHSV under such combination of conditions as to convert said feed to a product at least about 30% by volume of which is liquid boiling in the gasoline boiling range having a clear Research Octane Number higher than the clear Research Octane Number of the feed; which improvement is engendered by utilizing as a catalyst, a zeolite as defined above having a modified activity equivalent to the activity of such zeolite which has had about 0.1 to 3 weight percent, based upon the total weight of aluminosilicate, of a moiety of an element of Group Ia or Va of the Periodic Table incorporated therewith. This modified activity can be provided by steaming the zeolite, as will be detailed hereafter.

The zeolite portion of the catalysts to which this invention is directed have high silica to alumina ratios as aforesaid, preferably at least about 30 and most preferably at least about 60. An important characteristic of the crystal structure of these zeolites is that it provides constrained access to, and egress from, the intracrystalline free space of the zeolite by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by eight membered rings of oxygen atoms, then access to molecules of larger cross-section than normal hexane is excluded and the zeolite is not of the desired type. Windows of ten-membered rings are preferred, although excessive puckering or pore blockage may render these catalysts ineffective. Twelve-membered rings do not generally appear to offer sufficient constraint to produce the advantageous conversions, although such structures can be conceived, due to pore blockage or other cause, that may be operative.

Rather than attempt to judge from crystal structure whether or not a particular zeolite possesses the necessary constrained access, a simple determination of the "constraint index" may be made by passing continuously a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000°F for at least 15 minutes. The zeolite is then flushed with helium and the temperature adjusted between 550°F and 950°F to give an overall conversion between 10% and 60%. The mixture of hydrocarbons is passed at 1 liquid hourly space velocity (i.e. 1 volume of hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Zeolites suitable as catalyst for use in the present invention are those having a constraint index from 1.0 to 12.0, preferably 2.0 to 7.0.

In a preferred aspect of this invention, the zeolite portion of the catalyst is selected as one having a crystal density, in the dry hydrogen form, of not substantially below about 1.6 grams per cubic centimeter. The dry density for known structures may be calculated from the number of silicon plus aluminum atoms per 1000 cubic Angstroms, as given, e.g. on page 11 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1969. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter.

This high density, of course, must be associated with a relatively small amount of free space within the crystal, which might be expected to result in more stable structures. This free space, however, is important as the locus of catalytic activity.

Therefore, the preferred catalysts of this invention are those employing a zeolite having a constraint index, as defined above, of about 1 to 12, a silica to alumina ratio of at least about 12 and a dried crystal density of not less than about 1.6 grams per cubic centimeter.

Synthetic zeolites which are useful in this invention are those which have been produced from a reaction medium including organic cations in a quantity sufficient to satisfy at least part of the anionic nature of the zeolite. As prepared, such zeolites may be catalytically inactive but they may be activated by known procedures of calcining and cation exchange. In this regard it is interesting to note that zeolites which meet the criteria set forth above which contain only organic cations and/or alkali metal cations seem to be substantially inactive to catalyze aromatization reactions. It appears that there is a necessity for some of the active sites of the zeolite to be in the hydrogen form for it to be an active aromatization catalyst. According to this invention, the liquid yield (i.e. gasoline yield) is increased at no sacrifice of upgraded quality if a limited number of the active sites of the zeolite are satisfied by a Group Ia or Va metal moiety.

Illustrative synthetic zeolites which are useful in this invention are ZSM-5, ZSM-11, ZSM-12, ZSM-21 and TEA mordenite. Illustrative Group Ia and Va metal moieties are sodium, lithium, potassium, phosphorus, antimony and arsenic. Proportions of additive metals useful in this invention, expressed on the basis of proportion of active sites of the zeolite occupied thereby, are: zinc and/or cadmium 0.1 to 10%; Group Ia and/or Va metal 0.1 to 3; and hydrogen 0.1 to 1%. It should be noted that it is within the spirit and scope of this invention to have other materials incorporated in the catalyst, such as, for example, copper which seems to enhance the regenerability of the catalyst by retarding zinc and cadmium vaporization; and/or a good hydrogenation/dehydrogenation function such as nickel or palladium should the circumstances otherwise call for it. The modified zeolite to which this invention is directed may be used as such or it may be in a matrix such as silica, alumina, silica-alumina or other known matrixing materials. In a matrix, the modified zeolite should account for about 5 to 95% of the total weight.

As noted above, the modification of zeolite activity which is essential to the practice of this invention may be accomplished by adding a further modifying metal such as potassium or phosphorus for example. It can also be achieved by judicious selection of the silica to alumina ratio of the zeolite catalyst, for example, to a range of about 35 to 1500 or through other techniques. In particular, one excellent method of achieving this modification of zeolite activity is to subject it to high pressure steaming under controlled conditions. One very attractive property of the particular group of catalysts to which this invention is directed is their ability to withstand substantial steam treatment without total deactivation as occurs with other zeolites. In fact, modification of catalytic activity by steam treatment in order to change the reaction product composition may well be unique to this class of zeolite. In this regard it is recognized that some zeolites have in the past been steam treated to reduce their activity so that they will have an industrially useful life. That is to be distinguished from the catalyst modification referred to herein which is not catalyst cycle life related but rather is product distribution and yield related. Representative steaming conditions for ZSM-5 zeolite are 900° to 1400°F for 1 to 72 hours with superheated steam (substantially no moisture content).

It has been noted above that the modified aromatization catalyst of this invention is of value to increase the high octane liquid yield in both a moderate severity shape selective cracking-alkylation process and an aliphatic hydrocarbon aromatization process. It has been pointed out that these processes are not so distinct as to be cleanly separable but rather overlap as to operating conditions and to specific conversions. It is preferred in the practice of this invention to operate at conditions which are intermediate between the optimum conditions for these two types of conversion.

Thus preferred operating temperatures are about 700° to 900°F, preferred space velocities are about 0.5 to 10 WHSV and preferred feeds are hydrocarbon compositions containing about 0 to 20 weight percent aromatics, predominantly $C_6$ to $C_8$ aromatics, and about 60 to 100 weight percent straight and branched chain paraffins and olefins. While naphthenes can be present, this process is less effective than is platinum reforming for upgrading naphthenes and therefore their proportion is preferably minimized. Typical feeds for this process are Udex raffinate, reformate, virgin naphtha, cracked gasoline and mixtures thereof.

The Group Ia and/or Va metal moiety can be incorporated with the zeolite by any of several known techniques. If such ions are present during formation of the zeolite, their removal during activation can be limited to retain the desired proportion with the zeolite. They can be back exchanged into an activated zeolite or they can be impregnated or vapor deposited thereinto and thereonto. Ester interchange reactions may be of use with respect to Group Va metals.

The following Examples are illustrative of the practice of this invention; all parts and percentages are by weight unless expressly stated to be on some other basis.

TABLE 1

| Example No. | Catalyst | Temp °F | WHSV | $C_1^-$ | Composition % $C_5^-$ 430°F | Ar | R + O |
|---|---|---|---|---|---|---|---|
| Feed | | | | | 100 | 6.9 | 61.0 |
| 1 | Zn ZSM-5 | 550 | 1 | 13.8 | 86.1 | 11.0 | 78.6 |
| 2 | $S_iO_2/Al_2O_3=35$ | 600 | 1 | 32.3 | 67.5 | 15.7 | 84.8 |
| 3 | 0.84% Zn | 650 | 1 | 42.4 | 57.3 | 20.1 | 89.8 |
| 4 | | 700 | 1 | 51.1 | 48.2 | 30.2 | 98.0 |
| 5 | | 750 | 1 | 53.3 | 46.2 | 39.4 | 105.7 |
| 6 | | 800 | 1 | 52.7 | 47.1 | 46.2 | 106.7 |
| 7 | Na Zn ZSM-5 | 650 | 1 | 17.36 | 80.7 | 12.73 | 78.7 |
| 8 | $S_iO_2/Al_2O_3=70$ | 700 | 1 | 23.7 | 73.6 | 15.7 | 80.5 |
| 9 | | 750 | 1 | 29.9 | 66.0 | 22.1 | 84.9 |
| 10 | | 800 | 1 | 36.6 | 56.9 | 32.6 | 92.0 |
| 11 | Li Zn ZSM-5 | 700 | 1 | 19.9 | 80.2 | 12.7 | 79.2 |
| 12 | $S_iO_2/Al_2O_3=70$ | 750 | 1 | 25.9 | 74.1 | 19.2 | 82.9 |
| 13 | | 800 | 1 | 34.6 | 67.5 | 28.3 | 90.2 |
| 14 | | 850 | 1 | 39.4 | 60.6 | 41.4 | 96.4 |
| 15 | K Zn ZSM-5 | 700 | 1 | 20.5 | 79.5 | 15.2 | 80.5 |
| 16 | | 750 | 1 | 37.3 | 70.4 | 24.3 | 85.9 |
| 17 | | 800 | 1 | 38.6 | 61.4 | 32.6 | 92.7 |
| 18 | | 850 | 1 | 43.6 | 56.2 | 44.1 | 100.8 |

TABLE 2

| Example No. | Catalyst | Temp °F | WHSV | $C_1^-$ | Composition % $C_5^-$ 430°F | Ar | R + O |
|---|---|---|---|---|---|---|---|
| Feed | | | | | 100 | 4.1 | 61.8 |
| 19 | K Zn ZSM-5 | 675 | 1 | 12.5 | 87.5 | 8.7 | 80.1 |
| 20 | $S_iO_2/Al_2O_3=35$ | 700 | 1 | 15.0 | 85.0 | 12.1 | 81.6 |
| 21 | | 725 | 1 | 18.8 | 81.3 | 16.1 | 83.7 |
| 22 | | 750 | 1 | 25.2 | 74.6 | 21.2 | 86.9 |

TABLE 3

| Example No. | Catalyst | | Temp °F | WHSV | $C_4^-$ | Composition % $C_5^-$ — 430°F | Ar | R + O |
|---|---|---|---|---|---|---|---|---|
| | (K Zn ZSM-5) $S_iO_2/Al_2O_3 = 70$ | | | | | | | |
| Feed | | | | | | 100 | 41.2 | 76.6 |
| | % K | % Zn | | | | | | |
| 23 | 0.6 | 0.2 | 650 | 1 | 34.3 | 65.7 | 53.7 | 100 |
| 24 | 0.2 | 1.0 | 750 | 1 | 30.0 | 70.0 | 66.1 | 99.6 |
| 25 | | | 775 | 1 | 23.3 | 76.7 | 73.4 | 99.7 |
| 26 | 0.4 | 1.0 | 800 | 1 | 30.3 | 69.7 | 65.7 | 98.3 |
| 27 | 0.6 | 0.2 | 800 | 1 | 31.0 | 69.0 | 65.8 | 99.5 |
| 28 | 0.6 | 1.0 | 900 | 1 | 29.2 | 70.8 | 59.8 | 97.0 |
| 29 | 1.0 | 1.0 | 1000 | 1 | 22.1 | 77.9 | 43.2 | 92.3 |

These data have been assembled and plotted as FIG. 1 in the accompanying drawing. The two curves of this drawing define the liquid, $C_5^+$, yield vs. the octane of this liquid for the conversion described herein. Curve 1 shows the yield-octane relationship where the catalyst has a Group Ia or Va metal incorporated therein, while curve 2 shows the yield-octane relationship where the catalyst has only zinc incorporated therein. It will be seen from a consideration of these curves that the inclusion of a Group Ia or Va moiety substantially flattens the yield-octane curve, whereby showing that for a given desired product octane, the liquid yield obtained is substantially higher.

It should also be noted in considering these data that the two yield-octane curves intersect at a product octane of about 82. It should therefore be apparent that where the feed to the instant process has an initial clear research octane of less than 82, this catalyst is only desirable for use in a process operated at a severity sufficient to produce a liquid product having a clear research octane higher than about 82. It will also be clear that the instant catalyst continues to be more valuable as this product octane value increases, that is, as the severity of the reaction conditions increases.

In another series of comparative runs, a Udex raffinate as defined above was converted with a ZSM-5 zeolite as aforesaid. One series of runs and zinc exchanged ZSM-5, one series of runs used zinc/potassium exchanged ZSM-5 and one series of runs used a zinc ZSM-5 which had been steamed for 4.5 hours at 1000°F. All runs were at 1.0 WHSV. The following table reports the data from these runs.

TABLE 4

| Example No. | Catalyst | Temp°F | WHSV | $C_4^-$ | $C_5^-$ — 430°F | Ar | R + O |
|---|---|---|---|---|---|---|---|
| 30 | Zn ZSM-5 | 600 | | 30.5 | 68.3 | | 72.7 |
| 31 | | 625 | | 47.4 | 59.5 | | 78.8 |
| 32 | | 650 | | 41.3 | 54.7 | | 85.6 |
| 33 | | 675 | | 41.2 | 48.5 | | 92.7 |
| 34 | | 700 | | 50.2 | 45.0 | | 93.7 |
| 35 | Zn K ZSM-5 | 600 | | 8.2 | 91.9 | | 60.3 |
| 36 | | 650 | | 16.0 | 82.7 | | 65.0 |
| 37 | | 700 | | 24.1 | 74.1 | | 72.9 |
| 38 | | 725 | | 30.1 | 66.8 | | 78.0 |
| 39 | | 750 | | 34.2 | 61.9 | | 82.1 |
| 40 | Steamed | 600 | | 13.3 | 86.5 | | 62.5 |
| 41 | Zn ZSM-5 | 650 | | 21.9 | 77.2 | | 68.0 |
| 42 | | 700 | | 37.8 | 69.5 | | 74.7 |
| 43 | | 725 | | 33.9 | 62.8 | | 79.7 |
| 44 | | 750 | | 38.6 | 56.8 | | 86.6 |

Figure 2:
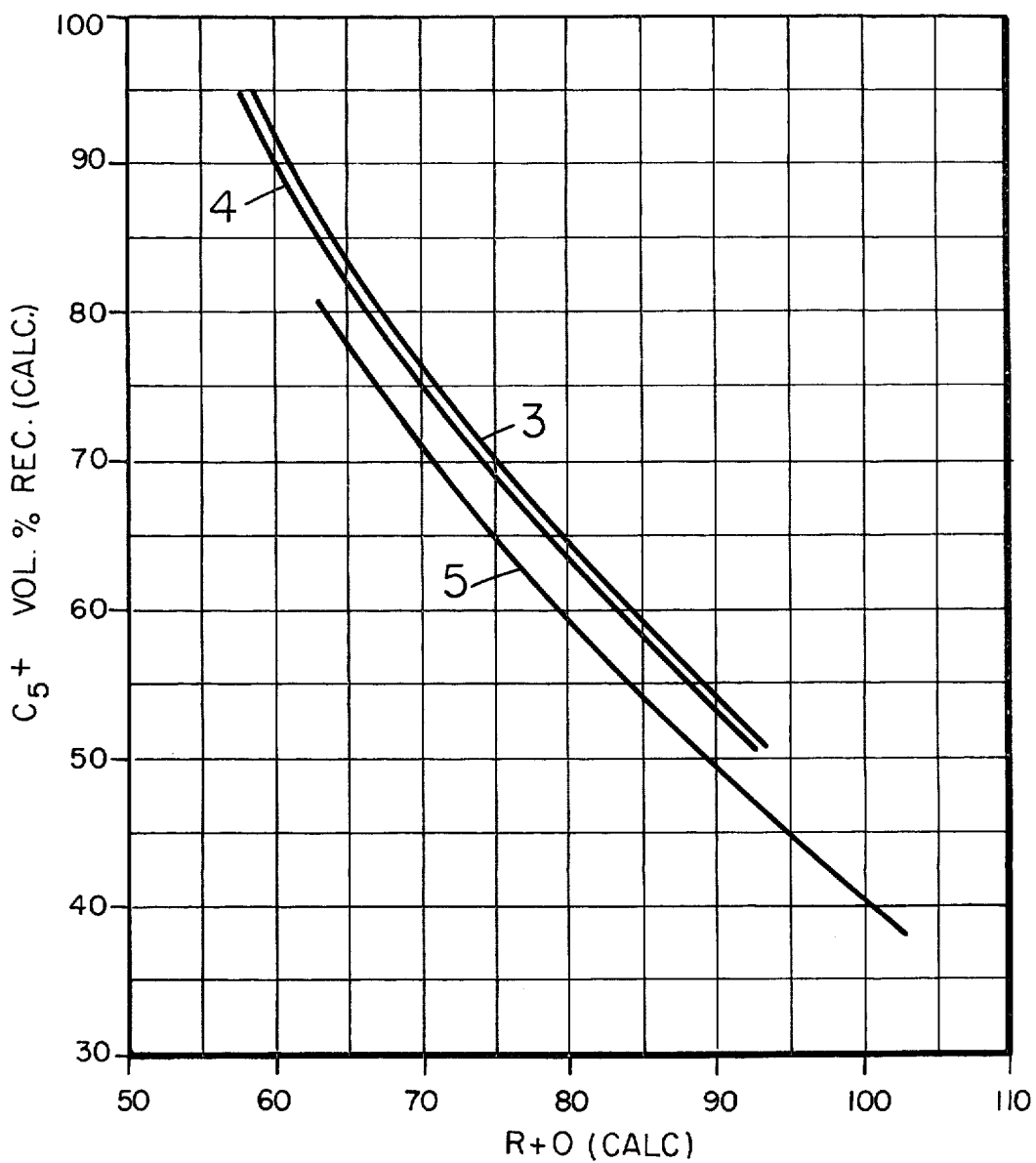

These data have been assembled and plotted as FIG. 2 in the accompanying drawing. The three curves show liquid yield vs. clear octane. Curve 3 is for Zn K ZSM-5; curve 4 is for steamed Zn ZSM-5; and curve 5 is for Zn ZSM-5.

What is claimed is:

1. In the process of upgrading the octane number of feed hydrocarbon fractions boiling in the naphtha range having a clear research octane number of less than about 65 to products boiling in the same range having a clear research octane number of at least about 82 by contacting such feed fractions with a catalyst comprising a crystalline aluminosilicate zeolite catalyst having a silica to alumina ratio of at least about 12, a constraint index of about 1 to 12 and a crystal density of not substantially below about 1.6 grams per cubic centimeter at elevated temperatures of about 500° to 1500°F; the improvement, whereby converting more of said feed to said product at an equivalent octane number increase, which comprises utilizing as said catalyst said zeolite having about 0.1 to 10 weight percent of at least one member selected from the group consisting of zinc and cadmium incorporated therewith, said zeolite having a modified activity equivalent to the activity of such zeolite which has had about 0.1 to 3 weight percent of at least one metal moiety selected from the group consisting of sodium, lithium, potassium, phosphorus, antimony and arsenic incorporated therewith.

2. The improved process claimed in claim 1 wherein said incorporated metals are zinc and sodium.

3. The improved process claimed in claim 1 carried out at about 700° to 900°F.

4. The improved process claimed in claim 1 carried out at a space velocity of about 0.1 to 15 WHSV.

5. The improved process claimed in claim 1 wherein said zeolite is at least one member selected from the group consisting of ZSM-5, ZSM-11, ZSM-12, ZSM-21 and TEA mordenite.

6. The improved process claimed in claim 1 wherein said zeolite is ZSM-5 having a silica to alumina ratio of at least about 30.

7. The improved process claimed in claim 1 wherein said catalyst is zinc and sodium exchanged ZSM-5.

8. The improved process claimed in claim 1 wherein said incorporated metals are zinc or cadmium as set forth and said modified activity is engendered by steaming said zeolite prior to carrying out said process.

* * * * *